United States Patent
Gries et al.

(10) Patent No.: US 6,633,595 B1
(45) Date of Patent: Oct. 14, 2003

(54) ARRANGEMENT FOR THE RESONANT FREQUENCY DOUBLING OF MULTIMODE LASER RADIATION

(75) Inventors: Wolfgang Gries, Berlin (DE); Harald Kneipp, Berlin (DE); Eckhard Zanger, Seddin (DE)

(73) Assignee: Laser Analytical Systems GmbH, Stahnsdorf (DE)

( * ) Notice: Subject to any disclaimer, the term of this patent is extended or adjusted under 35 U.S.C. 154(b) by 109 days.

(21) Appl. No.: 09/767,257

(22) Filed: Jan. 22, 2001

(30) Foreign Application Priority Data

Jan. 20, 2000 (DE) .......................................... 100 02 418

(51) Int. Cl.$^7$ ............................................. H01S 3/101
(52) U.S. Cl. ............................. 372/22; 372/20; 372/98; 359/328
(58) Field of Search ............................. 372/22, 21, 20, 372/100, 98; 359/213, 328, 326

(56) References Cited

U.S. PATENT DOCUMENTS

| | | | | |
|---|---|---|---|---|
| 5,227,911 A | * | 7/1993 | Schiller et al. | ................ 372/22 |
| 5,289,491 A | * | 2/1994 | Dixon | ........................ 372/21 |
| 5,412,674 A | * | 5/1995 | Scheps | ........................ 372/22 |
| 5,969,780 A | | 10/1999 | Matsumoto et al. | |
| 6,069,903 A | * | 5/2000 | Zanger et al. | ................ 372/22 |
| 6,198,756 B1 | * | 3/2001 | Capara et al. | ................ 372/22 |
| 6,317,449 B1 | * | 11/2001 | Zanger et al. | ................ 372/20 |

OTHER PUBLICATIONS

E. Zanger, et al.; "Diode–pumped cw All Solid–state Laser at 266 nm" OSA Trends in Optics and Photonics, vol. 26, 1999; pp. 104–111.

* cited by examiner

*Primary Examiner*—Albert W. Paladini
(74) *Attorney, Agent, or Firm*—Norris McLaughlin & Marcus, P.A.

(57) ABSTRACT

An arrangement for the resonant frequency doubling of multimode laser radiation with resonators is provided, including mirrors and an optically nonlinear material. The arrangement ensures a dispersion-free tuning of the length of a passive resonator, and enables the frequency doubling of a multimode laser, which is resonant simultaneously for all modes of the laser radiation, and which is achieved by pairs of mutually oppositely disposed movable elements of an optically transparent material, such as prisms (P1, P2). The prisms are brought into the beam path of the resonator (R), formed from mirrors (M1 to M4) and optically nonlinear material (BBO). The prisms are movable elements (P1, P2) which are connected to adjusting elements such as piezoactuators, so that the optical length of the resonator (R) can be tuned and compensation for dispersion attained.

9 Claims, 1 Drawing Sheet

ARRANGEMENT FOR THE RESONANT FREQUENCY DOUBLING OF MULTIMODE LASER RADIATION

BACKGROUND OF THE INVENTION

The invention relates to an arrangement for the resonant frequency doubling of multimode laser radiation.

The use of a prism, which is moved by a rapid, short-stroke piczoactuator, for tuning the length of a passive resonator, is known (E. Zanger, R. Müller, B. Liu, M. K ötteritzsch and W. Gries "Diode-pumped cw all solid-state laser at 266 nm" in OSA Trends in Optics and Photonics, Vol. 26, Advanced Solid-State Lasers, pp. 104–111).

However, this arrangement is not suitable for tuning a resonator for doubling a multimode laser, since the angular deflection at the tuning prism results in dispersion, as a result of which the resonator is not resonant simultaneously for all modes of the laser radiation.

A resonant amplification of laser radiation is described in U.S. Pat. No. 5,969,780. From His, it is known that, in the case of a resonant doubling of the laser radiation from multimode lasers, the absolute length or the mode distance of the resonator must be adapted to the mode spectrum of the laser radiation, that is, the resonator lengths of the multimode laser and of the passive resonator must be equal, if the mode distances are to be the same. For this purpose, the system described for converting the frequency of multimode lasers contains two resonators, formed in each case by at least two mirrors, an energy source/amplifying element being accommodated in the first resonator and an optically nonlinear material in the second resonator. The output multimode radiation with frequency doubling of the input radiation, brought about in the first resonator, is supplied to the second resonator, where a portion of the multimode radiation is amplified resonantly.

SUMMARY OF THE INVENTION

It is therefore an object of the invention to develop a generic arrangement, with which a dispersion-free tuning of the length of a passive resonator is ensured, in order to enable the frequency doubling of a multimode laser, which is resonant simultaneously for all modes of the laser radiation.

Pursuant to the invention, the objective is accomplished as follows. Pairs of oppositely disposed movable elements of an optically transparent material, such as prisms, are accommodated in the beam path of the resonator, which is formed from mirrors and the optically nonlinear material. The movable elements are connected with adjusting elements, such as piezoactuators, so that the optical length of the resonator can be tuned and dispersion compensation is attainable.

The dispersion-free adaptation of the resonator lengths ensures that the resonance- is attained for all modes of laser radiation. Moreover, due to the use of at least two movable prisms, the resonator geometry is retained during a movement of the prisms.

DESCRIPTION OF THE PREFERRED EMBODIMENTS

Figure 1:
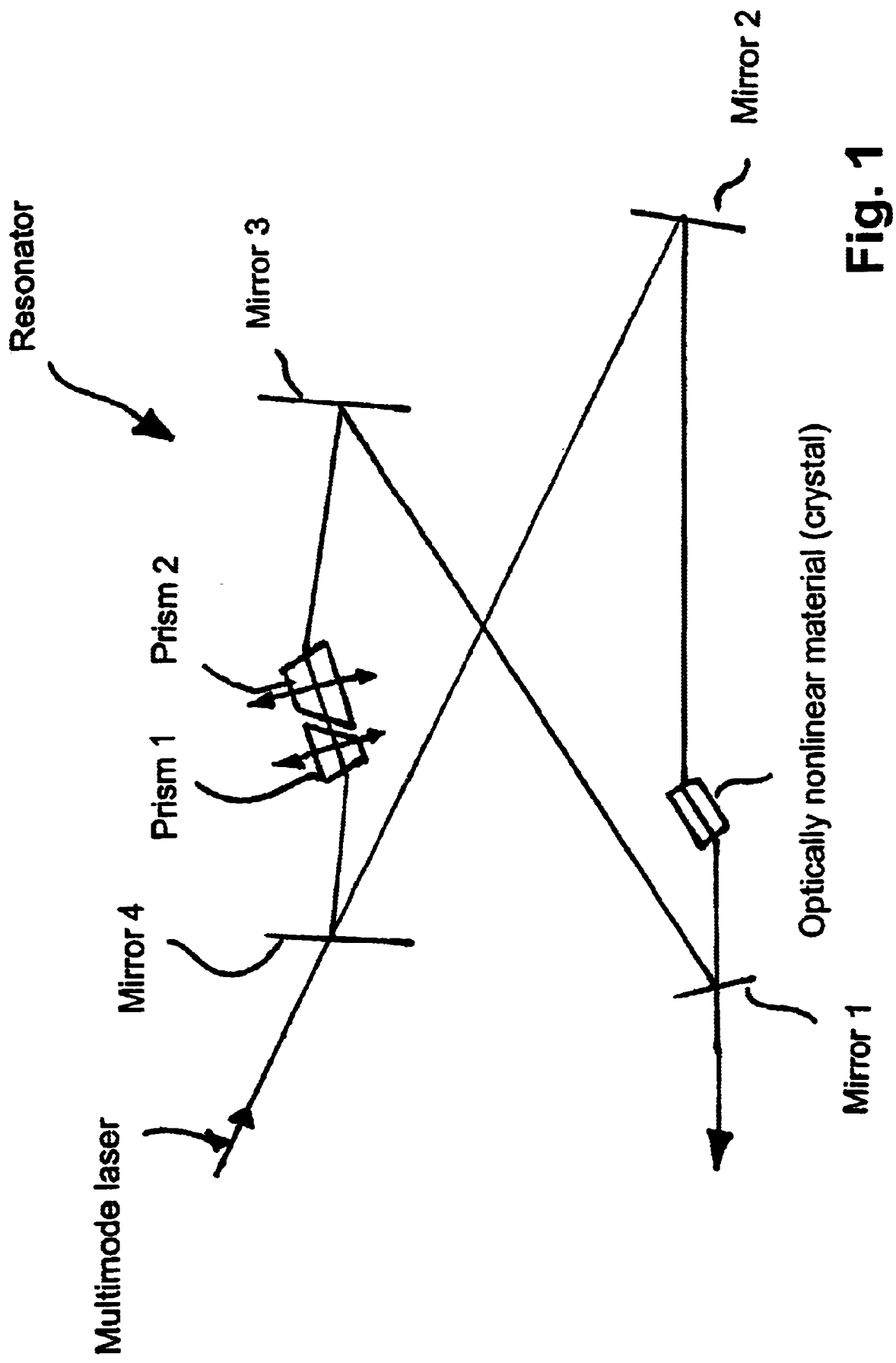
FIG. 1—the diagrammatic representation of an inventive arrangement with a ring resonator, formed from mirrors M1 to M4, a crystal BBO and two prisms P1, P2.

The invention is described in greater detail in the following by an example of an arrangement for the dispersion-free tuning of the length of a passive resonator.

The radiation of a multimode laser MMNL is coupled over the mirror M4 into the resonator R.

The mirrors M1 to M4, the crystal EBO and the prisms P1 and P2 are disposed relative to one another in such a manner, that the radiation in the ring, so formed, circulates resonantly. As a result, the intensity of the circulating radiation is intensified. This makes possible the efficient generation of radiation of doubled frequency in the nonlinear crystal BBO and the radiation is coupled out of the resonator R over the mirror M1.

The two prisms P1 and P2 are disposed in the beam path of the resonator R in such a manner, that their dispersion is compensated. One of the two prisms P1, P2, for example, prism P1, is moved in a known manner into the beam path by a short-stroke piezoactuator (not shown) for compensating rapid disorder, such as acoustic disorders.

The second prism P2 is moved by a long-stroke piczoactuator (not shown) to compensate for slow drift phenomena of the passive resonator and/or of a laser resonator, such as a thermal expansion or length change.

The movement of the prisms P1, P2 in the beam path takes place in the plane of the drawing. By these means, the glass path of the radiation and, with that the optical length of the resonator becomes longer or shorter.

The arrangement can also be used for tuning the optical length of linear resonators.

Resonator arrangements with more or fewer than four mirrors are also possible.

The arrangement is not necessarily restricted to two prisms; it is also possible to provide more pairs of prisms disposed opposite to one another. It is merely necessary that the number of prisms is an even number. The required compensation of the dispersion can be attained by the alternate arrangement of an even number of prisms.

Advisably, the prisms are configured and arranged, so that the radiation for minimizing reflection losses strikes the prisms P1 and P2 at the Brewster angle.

The prisms P1, P2 need not all consist of the same material. By acing different materials (for example, types of glass with different dispersions), it is possible to compensate for the parallel shift of the individual modes.

The prisms P1, P2 need not necessarily be moved by piczoactuators. Other shifting elements, such as pneumatic or magnetic elements, are also possible.

What is claimed is:

1. An resonator arrangement for resonant frequency doubling of multimode laser radiation, comprising
   (a) a multimode laser;
   (b) a plurality of mirrors;
   (c) an optically nonlinear material;
   (d) a pair of mutually oppositely arranged movable elements of optically transparent material;
      wherein (b) (c) and (d) form the resonator arrangement having an optical length, and are positioned in a beam path of multimode laser; and
      wherein the pair of mutually oppositely arranged movable elements of optically transparent material is moved such that the optical length of the resonator is being tuned and compensation for dispersion.

2. The arrangement of claim 1, wherein the pair of mutually oppositely disposed movable elements of optically transparent material comprise each end surfaces which are not parallel.

3. The arrangement of claim 1, wherein the pair of mutually oppositely disposed movable elements of optically transparent material comprises material with locally variable refractive index.

4. The arrangement of claim 1, wherein the pair of mutually oppositely disposed movable elements of optically transparent material is configured so that a possible parallel offset of the radiation on passage through the elements is compensated.

5. The arrangement of claim 1, wherein the pair of mutually oppositely disposed movable elements of optically transparent material are formed from material having different dispersion.

6. The arrangement of claim 1, wherein the radiation strikes the pair of mutually oppositely disposed movable elements of optically transparent material at the Brewster angle.

7. The arrangement of claim 1, wherein the pair of mutually oppositely disposed movable elements of optically transparent material is two prisms.

8. The arrangement of claim 1, wherein the optically nonlinear material is a crystal.

9. The arrangement of claim 1,
wherein a plurality of mirrors are four the mirrors;
wherein the pair of mutually oppositely arranged movable elements of optically transparent material is two prisms;
wherein the optically nonlinear material is a crystal; and
wherein the arrangement of the four mirrors, the prisms and the crystal are such that the beam paths forms a ring and the radiation along the paths circulates resonantly and is intensified.

* * * * *